Feb. 22, 1927.

C. J. BAER

1,618,401

CARGO FLEET FOR WATER NAVIGATION AND METHOD OF OPERATING SAID FLEET

Original Filed Feb. 11, 1924    7 Sheets-Sheet 1

Inventor:
Carl J. Baer.
By O'Neill & Bunn
Attorneys Patented Feb. 22, 1927.

1,618,401

UNITED STATES PATENT OFFICE.

CARL J. BAER, OF ST. LOUIS, MISSOURI.

CARGO FLEET FOR WATER NAVIGATION AND METHOD OF OPERATING SAID FLEET.

Application filed February 11, 1924, Serial No. 692,134. Renewed January 11, 1927.

This invention relates to boats, and primarily to freight boats adapted for navigation upon inland waterways, although the principles of the invention may, of course, be practiced upon passenger boats or upon any kind of river craft.

The primary object of the invention is to overcome, to the greatest possible degree, the present difficulties in the economic transportation of cargoes by river craft, both up and down the navigable rivers. It is the customary practice, with the present types of river craft designed for the transportation of freight, to load or attempt to load freight craft to a tonnage which is the maximum that any particular tow boat can haul, thereby avoiding waste power.

It is a recognized fact that tow boats make the best returns, in a monetary sense, on a down-stream haul, maximum speed being attained by the aid of the river current, and thereby expediting the delivery of the freight at a low ton-mile cost of operation. On the upstream trip, however, the current which facilitates the down-stream trip now acts as a decided deterrent, and, since the tow boat uses, as is customary, its maximum power in going down-stream, there is no reserve power available to assist in the return trip, and, even though the cargo may be lighter, the upstream trip consumes much more time than is consumed on the journey with the current.

If the barges or scows in the tow are sufficient in number, and so heavily laden as to require maximum horse-power for the down-stream tow, the surface or skin friction of the barges offers such a resistance on the upstream trip as to require the use of maximum power to return the empty barges to their destination, and it is often necessary to leave several barges at the down-stream terminal and return upstream with empty barges which are less in number than were the loaded barges taken down-stream. Manifestly, therefore, when a load is to be taken upstream, the number of loaded barges in the tow must be correspondingly reduced, or reserve power added, which is a very costly expedient in either event. On the return haul the great resistance is the skin or surface friction of the barges spread over a large area, coupled with the end thrust against the bow of each barge and the draw-back or "suction" effect of the stream. The end thrust or head resistance is, of course, greatest when running against the current. In the down-stream tow, with a boat speed of four miles per hour, and a current of four miles per hour, the head resistance would be found to be at four miles per hour in relation to the water resulting in an actual speed of eight miles per hour down-stream. In going upstream in the same current, with a boat speed of six miles per hour, the resulting actual or land speed would be two miles per hour, so that a tow consuming two days to go down the river would consume eight days in returning.

The ratio of time required, between the upstream and down-stream hauls, will obviously vary in accordance with the speed of the current and the topography of the stream, but such ratio generally runs from about four to one, to somewhere around eight to one, the cost ratio per ton mile, between the down-stream and upstream haul, varying in proportion, depending upon the income derived from the cargo taken upstream.

It is the object of this invention, therefore, to reduce the cost of the navigation by eliminating the end thrusts and draw-back on practically all of the boats in the water.

Another object of the invention is the provision of methods and means which minimize the skin friction on the wetted surface of many of the barges in the tow.

Still another object of the invention is the provision of methods and means permitting the upstream haul of empty barges so that there is no end thrust, draw-back, or skin resistance imparted to such barges, and Still another object is to provide methods and means to so arrange and navigate the barges in the tow that the difficulties incident to river navigation of this character will be reduced to a minimum.

In the accomplishment of the above indicated objects and purposes, I arrange the freight barges in a formation for the down-stream haul, and seal the spaces between the ends of the connected barges in a manner such as set forth in my Patent No. 1,403,828, although not necessarily using the specific sealing means shown in said patent. A chain of barges so connected will carry the water along between each pair of barges, and the end thrust and draw-back effect will be operative only upon the barges which are at the front and rear, respectively, of the tow, as will be understood.

In the upstream pull I similarly provide the water sealing means between the ends of the connected barges which are being pulled through the water and, in addition thereto, I utilize a large "mother" boat capable of receiving on board a number of empty barges in telescoped or nested position. Such mother boat and cargo of barges are taken upstream, the only resistance being that imposed against the mother boat.

Other objects of the invention will be made apparent in the following specifications, when taken in connection with the drawings forming a part thereof.

Now referring specifically to the drawings forming a part of the specification, it may be stated that the fleet formation may be varied as desired, either for the upstream or down-stream trip. The fleet will comprise a mother boat A, and a plurality of barges or freight units B, hereinafter called units, each unit being a duplicate of the other unit except for a variance in width. The power is furnished by one or more power boats, or tugs C, which may be placed at the front or rear of the fleet, or one at each end, as desired. In the fleet assembly shown in Fig. 1, Sheet 1, the fleet is traveling in the direction of the arrow, with a tug C at each end, and the mother boat A immediately aft of the bow tug.

Figure 29:
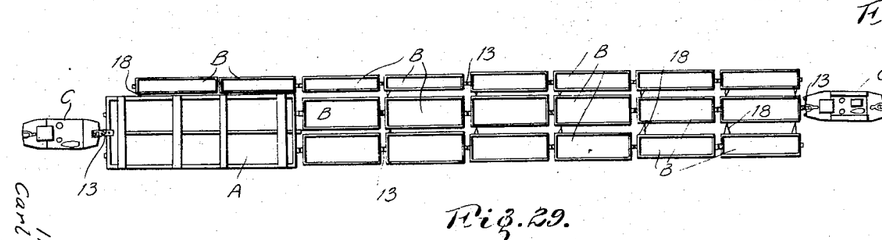
Fig. 29, Sheet 5, is a plan view showing a different assembly of the fleet of barges, mother boat and power boats.

Another formation of the fleet is shown in Fig. 29, Sheet 5, where the same number of units B are in the tow, but certain of them are arranged laterally of the mother boat, and the wider units B of the fleet.

It is a purpose of this invention to provide instrumentalities, and to so arrange the fleet formation, as to eliminate, to the maximum, the end thrusts, draw-back effects, and the skin friction of the water on the wetted surface of all the units of the fleet. With this end in view, therefore, between every pair of units B of the fleet, and between the mother boat and the adjacent unit, is provided a housing or dead-head plates, which function exactly as do the structures covered by my Patents Nos. 1,395,889, 1,400,787, 1,403,828, and 1,406,632, to seal the space between the ends of two connected units, and thereby virtually carry along, as a part of the tow, the water which is between said ends. Manifestly, such structures materially reduce the resistance to the travel of the boats through the water, eliminating thrusts against the front end of each boat, and minimizing the "draw-back" effect at the rear end of each. Various forms of dead-head plates may be used to meet different conditions, as hereinafter described.

By arranging my units in formation as shown, I also eliminate skin friction of the water, to a very marked degree. In the formation shown in Figs. 1 and 29, hereinbefore referred to, it will be noted that, with the dead-head plates in position, the water between the two parallel rows of units is carried along with the units, and there is no skin friction upon the right hand side of the units in the left row, nor upon the left hand side of the units in the right row.

*The mother boat.*

Figure 6:
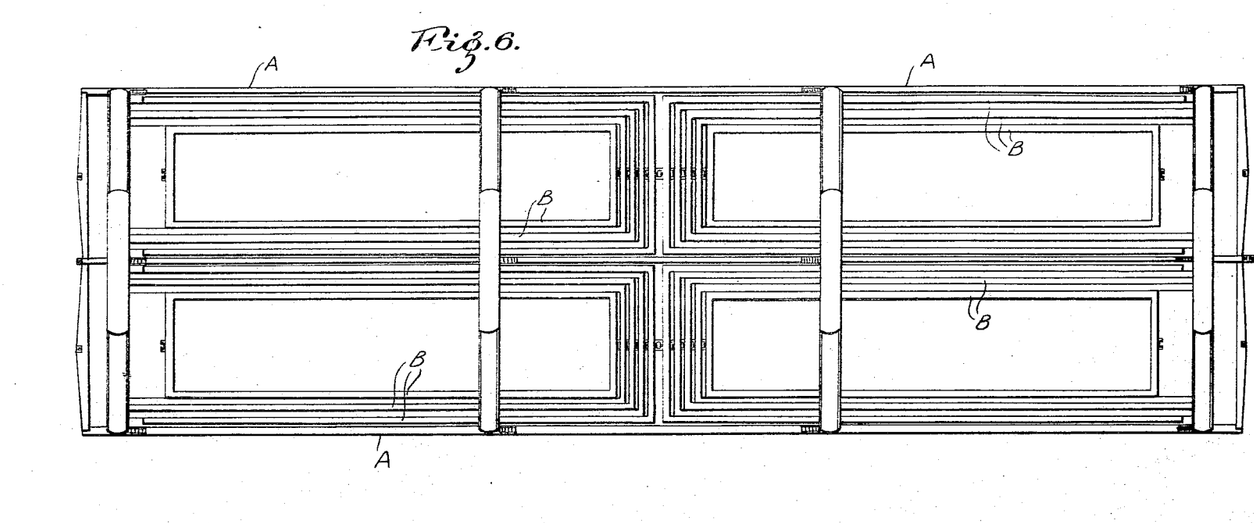
Fig. 6, Sheet 2, is a top plan view of a mother boat loaded with a plurality of freight-carrying barges.
Figure 7:
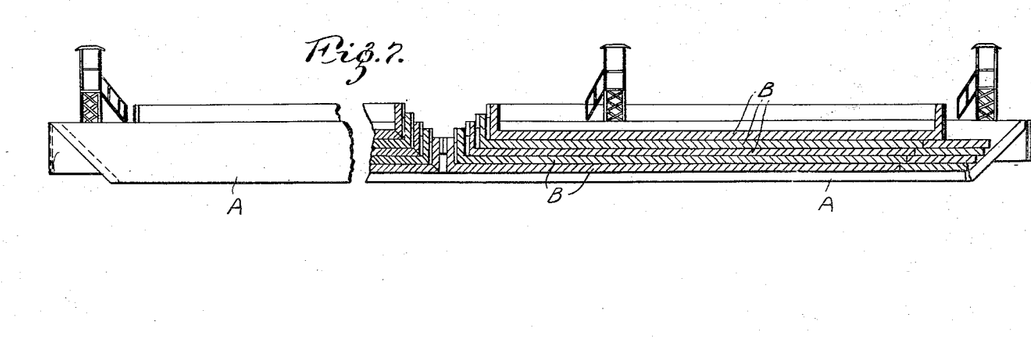
Fig. 7, Sheet 2, is a partly broken away sectional view taken longitudinally through Fig. 6.
Figures 8, 9, 10, 11:
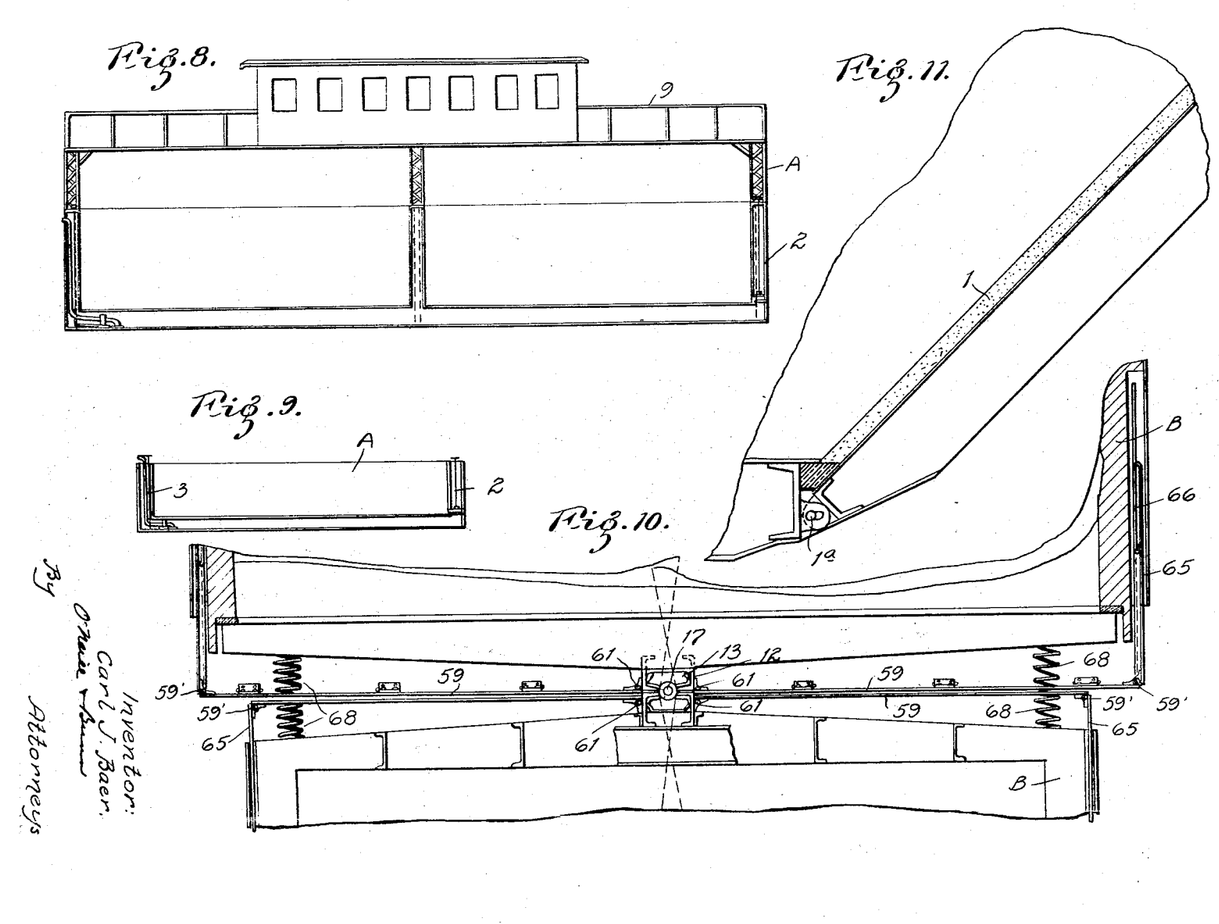
Fig. 8, Sheet 3, is a lateral section taken through the mother boat.
Fig. 9, Sheet 3, is a similar section taken through the barge.
Fig. 10, Sheet 3, is a fragmentary sectional plan view showing two connected boats of different widths and including the coupling member and the end sealing plates.
Fig. 11, Sheet 3, is a fragmentary side elevation in section, of the pivotally mounted end gates of the barges and mother boat.

The mother boat A is more than twice as long as the units B, and slightly more than twice the width of the widest unit B. It may be a flat barge-like structure, and must be capable of receiving upon its bottom a plurality of units B, arranged in tiers, as shown in Figs. 6 and 7, Sheet 2. It is equipped with an end gate 1, pivoted at 1ª, as shown in Fig. 11, Sheet 3, which is adapted to be lowered so that the units B may be drawn on board, the units being then arranged as shown in Figs. 6 and 7. Each unit in the fleet is of a width which varies from that of the adjacent unit, so that the units may be nested in the mother boat, one within the other, the rear end gate of the larger unit being lowered, and lying flat upon the floor of the mother boat, as shown in Fig. 7.

Figure 33:
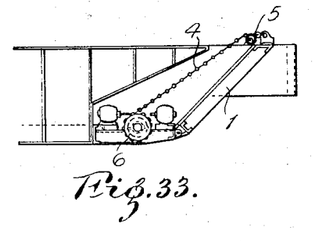
Fig. 33, Sheet 6, is a fragmentary sectional view of center of the mother boat, at the end.

The mother boat is equipped with seacocks 2, as shown in Fig. 8, whereby it may be lowered in the water to facilitate the operation of loading the units thereon, and is also equipped with pump mechanisms 3, for removing the water after the units are loaded thereon, and the gates 1 raised to water-sealing position. The boat A also carries chains 4, Fig. 33, Sheet 6, which are connected to the pivoted gates 1, the chains being trained over a sheave 5, to independent electric winches 6, one for each gate 1. In practice, sea cocks 2 are opened until boat A is lowered with deck sufficiently below hull of unit B to permit unit B to be drawn within on its own flotation. Buoyancy of boat A is retained at all times at the will of the operator by having sufficient bulkhead capacity to prevent complete submergence and loss of craft in deep water. A chain 7, connected to a hand or power operated winch 8, mounted upon the superstructure 9 of the boat A, is then secured to a projection 10 on the unit B, and the unit pulled into the boat A, to the position shown in Figs. 6 and 7, after which the end gate 11 of the unit is lowered and the next unit B similarly hauled into the boat A. It is to be noted that, since all of the units B are of varying widths, one of them may be received within the other, and that the gates of all of the units are left open, as shown in Fig. 7, permitting any water to drain out of the units B to the boat A, from which it is taken out by the pumps 3.

After the desired number of the units is loaded onto the boat A, the end gates 1 are lifted to the position shown in Fig. 7, and the boat A is towed or pushed up the river with its cargo of units B. It will be noted that, in the upstream trip the cargo of units meets no resistance from the water. It is true that the boat A will be submerged to a greater extent and, therefore, offer more resistance to the water than when empty, but the resulting skin-friction, and head and end resistance, as compared with that offered to the whole fleet, when the units of the fleet are in the water, will be approximately 75 per cent less. In other words, the boat A, with its load of units B, may be taken upstream, and consume only one-third of the time which would be consumed on this trip, under the same power, if all the units B were in the water.

While primarily intended for the upstream pull, the method of loading the units upon the mother boat may be used for downstream traffic, also, when a number of units are needed quickly at a certain point, and in still water the great advantage would be the transportation of the units at a speed greater than the highest speed possible when the units are in the water, by the use of the same power. When transporting freight upstream, the units carrying the cargo could be arranged in fleet formation to the extent required by the cargo demands, and the units not required could be loaded upon the mother boat and returned as a dead load on the upstream terminal, the speed of the haul being determined by conditions imposed.

The units.

The barges or units B may be flat-bottomed scow-like structures adapted to hold the maximum amount of freight, each unit, however, being equipped with the sealing or dead-head plates hereinbefore referred to, for the purpose of sealing the water between the ends of the connected units.

Figures 17, 18, 19, 20, 25, 27:
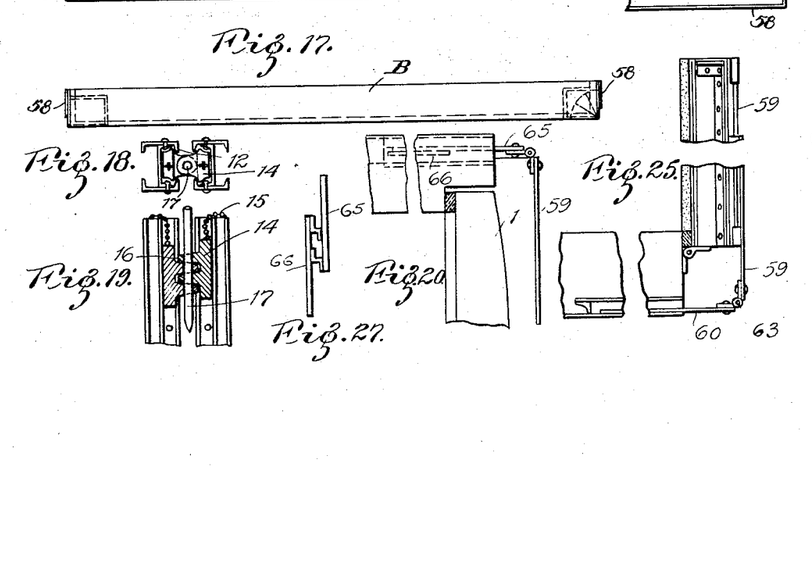
Fig. 17, Sheet 4, is a side view of the barge shown in Fig. 15.
Fig. 18, Sheet 4, is a top plan view of the coupler used between barges in formation.
Fig. 19, Sheet 4, is a vertical section taken through the coupler shown in Fig. 18.
Fig. 20 is a fragmentary top plan view of a corner of a unit B, equipped with my end-sealing plates.
Fig. 25 is a fragmentary top plan view of a corner of a unit equipped with the sealing plates.
Fig. 27 is a fragmentary top plan view showing the overlapping relation of the co-operating end-sealing plates.
Figure 26:
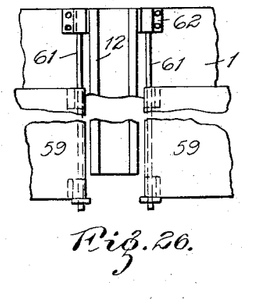
Fig. 26 is a fragmentary front elevation of the central portion of the end of a unit.
Figure 28:
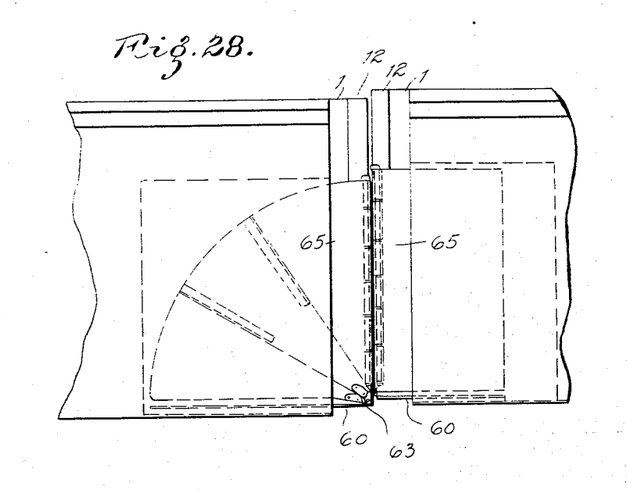
Fig. 28, Sheet 5, is an enlarged fragmentary side view of two connected boats, showing hinged-gate dead-head plates.
Figure 32:
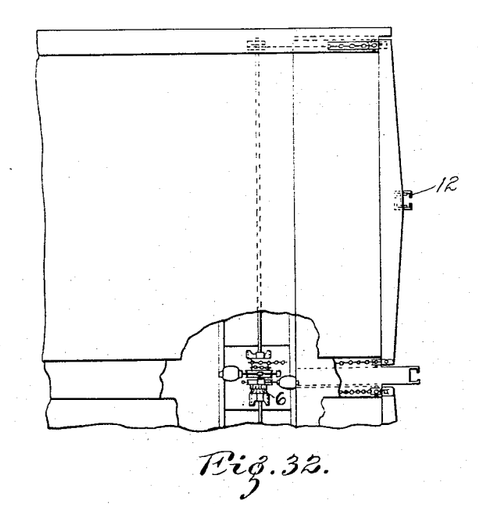
Fig. 32, Sheet 6, is a top plan view of one corner of the mother boat.
Figures 34, 35:
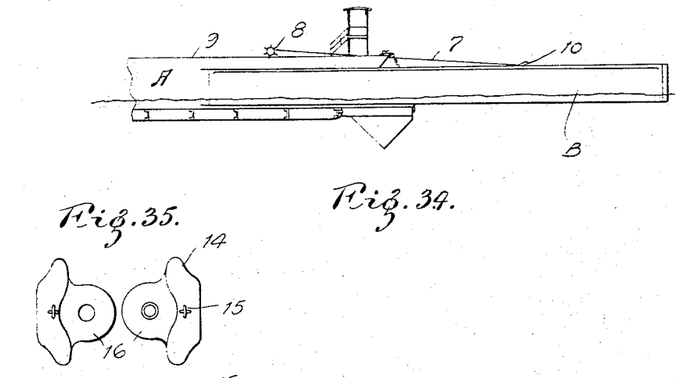
Fig. 34, Sheet 6, is a fragmentary view showing the relative positions of the boats when loading the first tier of barges upon the mother boat.
Figs. 35 and 36, Sheet 6, are, respectively, top and side plan views of a coupler equipped with chains.
Figure 36:
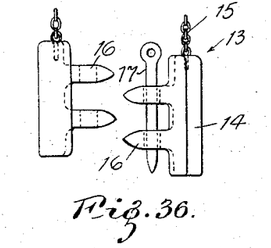

Each unit B and each boat A is connected to the adjacent unit, by the coupler shown in Figs. 18 and 19, Sheet 4, and Figs. 35 and 36, Sheet 6. The units B, the boat A, and the tugs C, are provided, on each end, with a vertically-extending, flanged trough 12, clearly shown in Figs. 32, Sheet 6, and 37, Sheet 7, the troughs 12, on adjacent and aligned units, being oppositely facing. The coupling element 13 comprises a slide 14, carried by each unit, and adapted to fit into the trough 12 to have sliding vertical movement therein, each element 13 being limited in its downward movement by a chain 15. Separated perforated projections 16, 16, extend laterally from the elements 13, the projections of two oppositely facing elements being adapted to fit into the spaces between the projections on the other element, so that the apertures in the projections of each element will be in alignment. A headed coupler pin 17 is then inserted in the apertures to have a loose fit therein, and locks the two units together. By this connection, the slidable elements may be so adjusted vertically in the trough 12 that a unit of heavy displacement may be secured to one of light displacement, as shown in Fig. 28, Sheet 5. Moreover, the projections 16 have rounded surfaces to permit relative movement under the rocking motion of the units, and the apertures in the projections 16 are larger than the coupling pin 17, to guard against breakage of the latter under such rocking movement, the relative size of the pin and apertures being indicated in full lines, Fig. 35.

The separator bars.

Figures 2, 3, 4, 5:
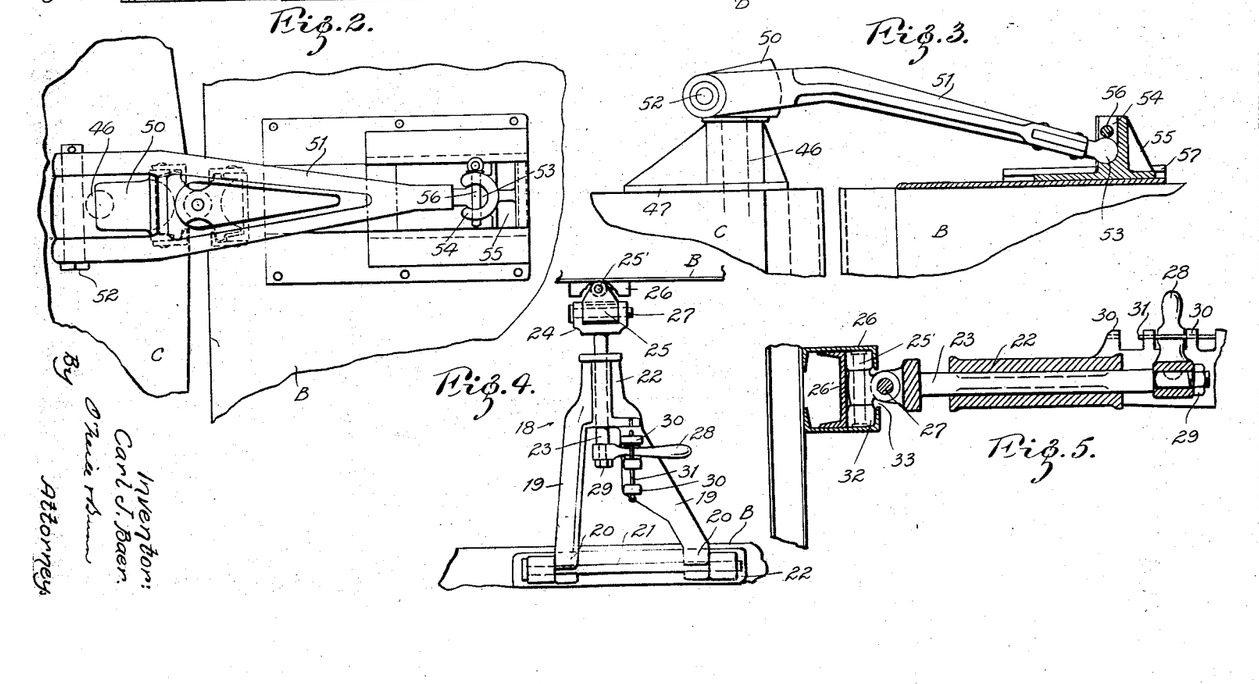
Fig. 2, Sheet 1, is a top plan view of a portion of the steering mechanism.
Fig. 3, Sheet 1, is a side view, partly in section, of the steering mechanism shown in Fig. 2.
Fig. 4, Sheet 1, is a top plan view of means which I provide for laterally connecting the barges each to each.
Fig. 5, Sheet 1, is a section taken through line 4—4 of Fig. 4.

To maintain lateral separation between the units B, I utilize the devices illustrated in Figs. 4 and 5, Sheet 1. Such devices include separator bars 18, comprising two arms 19, each provided on its end with a hook 20, adapted to be operatively secured to a rod 21, positioned in a housing adjacent the side of and extending longitudinally of a unit B. The arms 19, 19, converge to a collar 22, and a shaft 23 extends through said collar, as shown in Fig. 4, the shaft being of greater length than the collar, as indicated. The shaft carries a yoke 24 at its outer end, adapted to straddle a longitudinally apertured clip 25, which is pivoted for lateral movement by the pin 25', on a housing 26, carried by the opposite unit B. A headed coupling pin 27 extends through apertures in each branch of the yoke 24, and through the aperture in the clip 25, and effectually connects the rod 23 to the clip 25, a cotter-pin being inserted in one end of the pin 27, to retain it in position. The end of the rod 23, remote from the clip 25, is provided with a handle 28, rotatively mounted with respect to said rod, and retained thereon by a nut 29. One of the arms 19 is provided with a plurality of perforated and vertically extending spaced projections 30. In operation, the oppositely positioned units B are separated the desired distance, and the handle 28 is turned downwardly into the proper space between the projections 30, a pin 31 being inserted through the apertures in the projections, and above the handle, so as to retain the latter in its position, and thereby maintain the desired distance between the units.

The pin 25' extends through apertured anti-friction rollers 32, mounted in the housing 26, and the ears of the clip 25 project through an elongated slot 33 (Fig. 5) extending longitudinally of the housing 26, and permitting limited movement of the pin 25' and the rollers 32, longitudinally of the housing 26 along a track formed between a wall 26' and the front face of said housing. Such movement provides for a certain amount of a relative longitudinal movement between the connected units B. Under relative vertical movement between the units, the hooks 20 pivot around the rod 21, and the yoke 24 pivots around the pin 27, as will be understood. When it is desired to disconnect the two units the cotter pin 27 may be withdrawn.

Bracket 19 is then pivoted on rod 21 and laid upon deck of barge or detached from bar 21 by raising inverted hooks 21.

Distance bars 19 are provided on only two corners of barges in fleet formation, but deck piece 22 and bar 21 are permanently fastened to all four corners of all barges.

It is of course to be understood that all of the instrumentalities herein described, with respect to the above and other figures of the drawings, are formed of a size and strength to properly perform their intended purposes and functions.

Steering control.

Steering control of the units is provided, in addition to the usual rudders on the tow boat, by means of an electrically operated hydraulic unit controlling an arm on the tow boat and engaging instrumentalities on a coupled unit or boat. The necessary electrically-operated hydraulic unit is made commercially in several types, one type consisting of a constant speed electric motor and pressure cylinder, with a relief chamber for by-passing fluid not needed for pressure. Another type utilizes a constant speed motor with a multi-cylinder pressure chamber, the pressure and speed of the fluid being obtained by varying the eccentric control of the pistons.

Figures 30, 31:
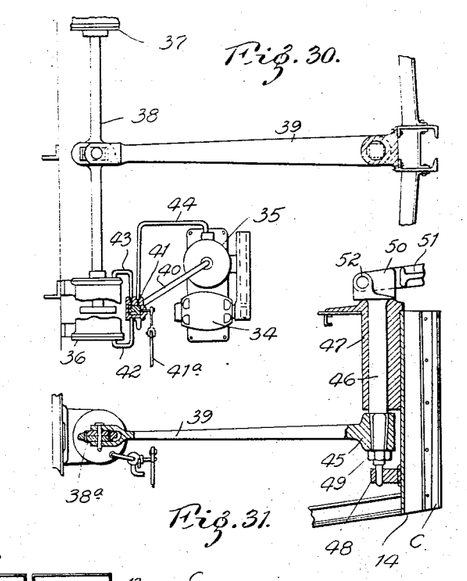
Fig. 30, Sheet 5, is a detail of the electric hydraulic cylinder mechanism which effects the steering operations.
Fig. 31, Sheet 5, is a side elevation of a portion of the structure shown in Fig. 30.

In Figs. 30 and 31, Sheet 5, I have illustrated one of such units in which only one fluid pressure generator is used, and connection to one pressure cylinder only is shown, the other end of the piston rod being simply a support, or, where extreme pressure is necessary, both rod supports may be pressure cylinders.

As shown, 34 is an electric motor, 35 the fluid pressure generator, 36 is the pressure cylinder and 37 the opposite cylinder, the piston rod 38 connecting both cylinders. As shown in Fig. 31, the trunnion pin bearing 38ª is mounted to slide crosswise of the shaft and cause radial movement of the steering arm 39.

In operation, with the constant speed generator set, fluid under pressure in tube 40 is distributed through two-way valve 41 provided with a control 41ª, extending to the pilot house, by means of passages in valve stem, through the tubes 42 and 43, to the ends of piston, the speed depending upon the degree of opening of the valve 41. When proper piston position has been attained the valve 41 is closed, and, during the operation of the piston, the fluid in the opposite end of the cylinder is returning to the generator. The valve 41 has distributor notches, permitting fluid to pass from the tube 40 to the tube 43. In closed position, the valve stem closes all passages and compels fluid to by-pass to the relief chamber.

Arm 39 is provided with a collar 45, which surrounds the lower portion of a steering post 46, held in a sleeve 47, mounted on the tow boat C. A perforated bearing 48 projects from the hull of the tug C, and receives the lower end of the post 46, and a nut 49 limits the downward movement of the arm 39. The post 46 projects above the deck level, and is provided with a head 50, to which is pivoted a bar 51, by means of a headed pivot pin 52, held in position by a cotter pin. (See Figs. 31 and 3). The arm 51 is preferably bifurcated, and extends downwardly to the deck of the unit B, preferably terminating in a ball end 53, adapted to fit into an upwardly projecting curved socket 54 provided in a block 55, and held in position against vertical movement by a pin 56. The block 55 is slidably mounted in a deck bracket 57, and, since the arm 51 effects the steering of the unit B, about the post 46 as a fulcrum, the difference of ratio, carried by the arm 51 being pivoted back of the unit fulcrum, is compensated for by the sliding movement of the block 55 in the bracket 57. From the foregoing, it will be noted that rotation of the post 46, by means of the arm 39, will operate to steer the connected unit as desired, the ball 53 rotating in the socket 54 under the turning movement of the unit, under impulse of the arm 51.

*The dead-head plates.*

As hereinbefore stated, the dead-head plates extend between connected units, or boats, for the purpose of preventing the water impact at the ends. In the construction of the plates shown in the patents heretofore referred to however, no provision is made for attachment of such plates to units having pivoted end gates, and, since the units in the present fleet, except possibly the smallest unit, are provided with such gates, it is necessary to adapt dead-head plates to this structure.

Figures 12, 13, 14, 15, 16, 21, 22, 23, 24:
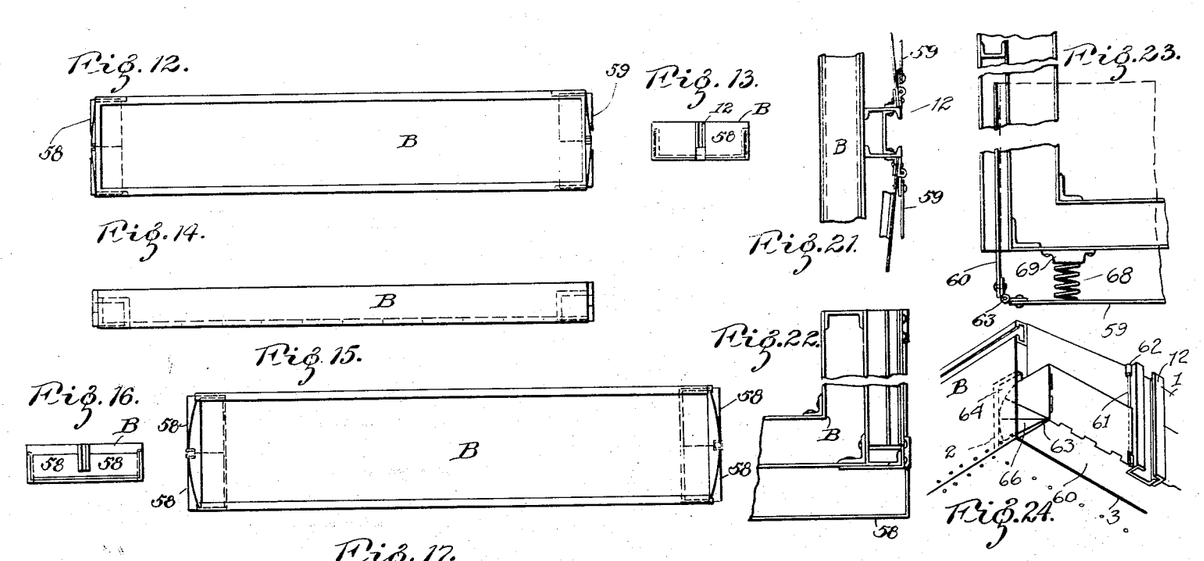
Fig. 12, Sheet 4, is a top plan view of a solid end barge.
Fig. 13, Sheet 4, is an end view, on a smaller scale, of the solid-end barge, equipped with an end-sealing plate of different design.
Fig. 14, Sheet 4, is a side elevation of the barge shown in Fig. 12.
Fig. 15, Sheet 4, is a top plan view of a gate-end barge, and its end sealing plate.
Fig. 16, Sheet 4, is an end view of the barge shown in Fig. 15.
Fig. 21 is a fragmentary top plan view of the central portion of the end of a unit equipped with my end-sealing plates.
Fig. 22 is a fragmentary top plan view of another corner of a unit.
Fig. 23 is a fragmentary top plan view of a corner of a unit equipped with spring devices.
Fig. 24 is a fragmentary detail perspective view of an end of a unit equipped with my end-sealing plates.
Figure 37:
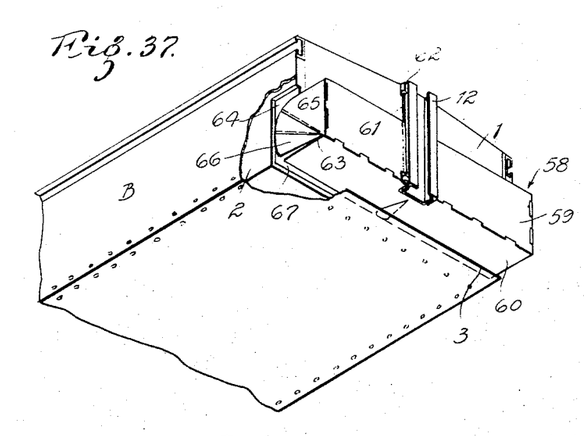
Fig. 37, Sheet 7, is an outside perspective view of the barge, showing the dead-head plates adapted to the end-gate construction.
Figure 38:
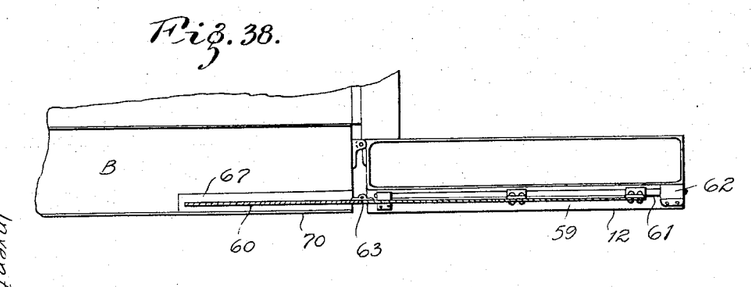
Fig. 38, Sheet 7, is a side elevation in section through end of hull showing position of the plates when the gate is lowered.

Figs. 12, 13 and 14, Sheet 4, are units having solid ends, and the dead-head plates shown in my prior patents are adapted for attachment to these structures The other figures shown on Sheet 4, however, depict dead-head plate structures adapted for use on units having pivoted end gates, such plates being more clearly shown in Fig. 10, Sheet 3, and Figs. 37 and 38, Sheet 7. In Fig. 37, is shown the application of a new form of dead-head plate to a swinging-gate unit, Fig. 38 showing the position of the plates when the gate 1 is opened. The plate 58 is formed of two leaves 59 and 60, the leaf 59 being secured to the coupler troughs 12, by the hinge bar 61, extending through an ear 62, formed on the trough 12. The leaf 59 is secured to the leaf 60, by means of an elongated pintle 63. In the use of this form of plate, the sides of the unit are cut away, as at 64, to provide space for right-angled overlapping projections 65, 66, carried by the plates 59, and as clearly shown in Fig. 37. In addition thereto, the unit is cut away on its bottom, as at 67, when the plates are in the position shown in Fig. 37, the leaves 59 and 60, and the overlapping projections 65 and 66, prevent access of the water to the end of the unit, and, a similarly equipped unit being coupled thereto, as shown in Fig. 10, Sheet 3, the water space between the units is sealed, coiled springs 68, 68 being mounted in sockets 69, carried either by the end gates or plates 59, and assisting in holding opposed plates 59 in contact, each to each.

When the gate 1 is lowered to the position shown in Fig. 38, during the pivotal movement of the gate, the leaves 59 and 60 gradually approach alignment, the leaf 59 sliding along the bar 61, and the leaf 60 sliding under the unit in the recess 67, a cover plate 70 being provided for said recess. As the gate 1 is raised, the plates will automatically return to the position shown in Fig. 37, as will be understood.

As indicated in Fig. 28, Sheet 5, the opposed dead-head plates function, even though one of the units is more heavily loaded than the other, and, therefore, more deeply submerged.

Figure 1:
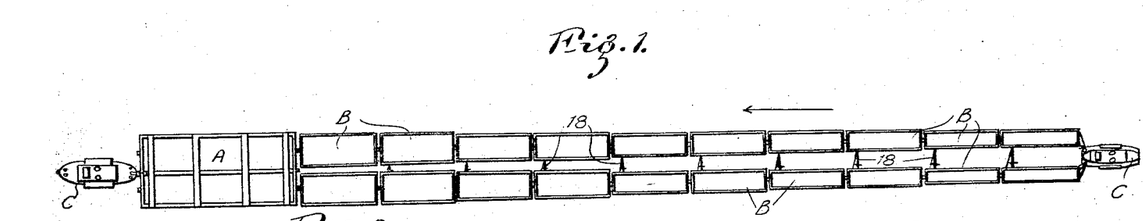
Fig. 1, Sheet 1, is a top plan view of a fleet of my barges and accompanying mother boat.

In the operation of my fleet, as above described, the mother boat A, the units B and the tugs C, are preferably arranged in the position shown in Fig. 1, Sheet 1, or in Fig. 29, Sheet 5, both fleets comprising twenty units B, coupled with a mother boat, and the power boats, the wider units being at the front of the fleet, the units gradually decreasing in width from front to rear, not only to facilitate loading onto the mother boat, but to present to the end thrust of the water a first unit of the widest front end. It is to be understood that between each of the units B shown in Fig. 1, are provided sealing or dead-head plates which function similarly to the plates disclosed in Figs. 37 and 38. In addition thereto, the units B, the boat A and the tugs C are all coupled by the coupling elements 13, shown in Figures 18, 19, 35 and 36, and all of the units are laterally spaced by the separator bars 18, shown in Figs. 4 and 5; also the power boats C are connected to the units B by the steering devices shown in Figs. 2, 3, 30 and 31.

It will be clear from the foregoing explanation that the separator bars 18 may be disconnected between any two adjacent units in the train, and that said units are adapted to move or flex independently of the adjacent unit, being held in alignment in the train by the couplings 13 only, so that the fleet may be made flexible at any point, or at any number of points, and rigid at any point, or any number of points. The fleet may be pushed from the rear by one of the boats C, on the down-stream run, certain of the units at the rear being stiffened by conventional cables while the forward units are flexibly connected and guided, by the front power boat C, around the bends of the river. Under these circumstances, the front portion of the fleet will negotiate the curve under the guiding power of the front power boat C, and the rear portion of the fleet will be brought around the bend, following the flexible portion.

On the upstream pull, the whole trip may be made, if desired, with all of the units in a flexible state, and the two power boats C at the front. In most instances, excepting at extremely acute curves in the channel, the movement of the current will retain the flexible units in the channel.

During the turning movement of the units, the deadhead plates pivot upon the hinge pins 59', preserving the water seal between connected units.

In the steering operation, which is governed by control 41ª, extending to the pilot house of the power boat C, the arm 39 is caused to rotate the post 46, causing the bar 51 to push the connected unit B to the right or left, as already described. If the towboat is lighter in weight than the connected unit B, the greatest movement will take place by the towboat itself, while, if the unit is lighter than the power boat, the former will first initiate the turning movement. It follows therefore that the first barge of a tow immediately behind a towboat would, by actuation of bar 51, be moved from bow to stern and thereby operate as a rudder the length of itself.

Similar in manner, but opposite in effect, would be the operation of stern towboat, for with steering controls operating on towboat bow, the lever arm forces are reversed and towboat would in this case follow the motion of steering controls. It is to be observed that the fleet formation is not limited to the formation shown, since it may be operated as a single tow, or in multiple, as desired by the conditions present.

In view of the foregoing, it will be obvious that I have devised a method whereby freight may be transported by water with a minimum of water resistance and a maximum of efficiency per horse-power.

Modification of the herein described method and structure may be suggested to those skilled in the art, but my invention covers all embodiments which fall fairly within the scope of the appended claims.

I claim:

1. A fleet adapted for water navigation and comprising a plurality of cargo units arranged in substantially parallel rows in which the units are connected end to end, in combination with means for preventing access of water into the space between the ends of the connected units in each row, and with means for detachably connecting and spacing the oppositely positioned units in the different rows.

2. A steering mechanism for two connected boats comprising a post rotatably mounted in one boat, an arm secured to said post to project laterally therefrom, a socket carried by the other boat and adapted for longitudinal movement, means for connecting said arm to said socket, and powered means for rotating said post.

3. A steering mechanism for two connected boats comprising a post rotatably mounted in one boat, an arm secured to said post to project laterally therefrom, a socket carried by the other boat and adapted for longitudinal movement, means for detachably securing said arm in said socket, and powered means for rotating said post.

4. Steering mechanism for two connected boats comprising a post rotatably mounted in one boat, an arm fixed to said post to project laterally therefrom and over the adjacent boat, a slidably mounted member carried by said last named boat and provided with a socket adapted to receive the end of said arm, means for rotating said post to swing said arm, and means for retaining the end of said arm in said socket.

5. The combination, with a plurality of relatively small cargo units of varying widths and each having a swinging end gate, of a cargo boat of a width permitting the reception therein of a plurality of such units, with opened end gates, arranged in nested relation.

6. The combination, with a plurality of relatively small cargo units of varying widths and each having a swinging end gate, of a cargo boat of a width permitting a plurality of rows of such units, with opened end gates, to be arranged in nested relation therein.

7. A cargo unit equipped on one side with a separator bar adapted to space it from a laterally adjacent unit, and on the other side with means adapted to be detachably secured to a like separator bar connected to an adjacent unit, in combination with means carried by the end of the unit adapted for cooperation with means carried by the end of a like unit, to seal the water space between the units, at the sides and bottom when they are connected end to end.

8. The combination with two connected boats, of a housing secured to the end of each boat and lying in close proximity to the housing of the other boat, each housing comprising a vertically extending plate and a horizontally extending plate pivotally secured thereto, said vertical plate having at each end a portion which overlaps the side of the boat to which it is secured, substantially as described.

9. A water-sealing housing for boats comprising a vertically extending plate spaced from the end of the boat, and provided with rearwardly extending flanges embracing each side of the boat adjacent its end, and a horizontally extending plate pivotally secured to said vertical plate, and provided with upwardly extending flanges embracing the sides of the boat.

10. A water-sealing housing for boats comprising a vertically extending plate spaced from the end of the boat, and provided with rearwardly extending flanges embracing each side of the boat adjacent its end, and a horizontally extending plate pivotally secured to said vertical plate, and provided with upwardly extending flanges embracing the sides of the boat, the flanges on said plates being arranged in overlapping relation, substantially as described.

11. A water-sealing housing for boats having pivotally mounted end gates, comprising a vertically extending plate spaced from said gate, and a horizontally extending plate hinged to said vertical plate, and means for so securing said vertical plate to said gate that a downward swing of the gate will cause said vertical plate to move towards the top of the gate, and the horizontal plate to move inwardly under said boat.

12. A water-sealing housing for boats having pivotally mounted end gates, comprising a vertically extending plate spaced from said gate, and a horizontally extending plate hinged to said vertical plate, and means for so securing said vertical plate to said gate that a downward swing of the gate will cause said vertical plate to move towards the top of the gate, and said horizontal plate to assume a straight line in parallelism with the bottom of the boat.

13. A water-sealing housing for boats having pivotally mounted end gates, comprising a vertically extending plate spaced from said gate, a horizontally extending plate hinged to said vertical plate, and means for so securing said vertical plate to said gate that a downward swing of the gate will cause said vertical plate to move towards the top of the gate, and said horizontal plate to assume a straight line in parallelism with the bottom of the boat, said means comprising a rod carried by said gate and extending through aligned vertically disposed apertures in said vertical plate, and a retaining plate carried by the bottom of said boat, substantially as described.

14. A device for laterally connecting two boats in spaced relation, comprising an inherently rigid member pivotally connected at each end to one of said boats, and means for adjusting the length of said member, and means for retaining said member in its adjusted position.

15. A device for connecting two boats arranged in substantial parallelism comprising a bar pivotally secured at one end to one boat, a rod slidable within the other end of said bar, and pivotally secured to the other boat, and means for retaining the rod in fixed position relative to said bar.

16. A device for connecting two boats arranged in substantial parallelism comprising a bar pivotally secured at one end to one boat, a rod slidable within the other end of said bar, and pivotally secured to the other boat, and means for retaining the rod in fixed position relative to said bar, said means comprising a handle rotatively mounted on said rod and engageable with a projection carried by said bar, and means for retaining said handle in position.

17. A device for connecting two boats arranged in substantial parallelism comprising a bar pivotally secured at one end to one boat, a rod slidable within the other end of said bar, and pivotally secured to the other boat, means for retaining the rod in fixed position relative to said bar, said means comprising a handle rotatively mounted on said rod and engageable with a projection carried by said bar, and means for retaining said handle in position, said means comprising a pin extending through said projection and preventing rotative movement of said handle.

18. A device for connecting two boats arranged in substantial parallelism comprising a bar having two arms each provided with hooked ends adapted for pivotal connection to one of said boats, the other end of said bar terminating in a collar, a rod longitudinally slidable within said collar and pivotally connected at one end to the other boat, and means for holding said rod in adjusted position longitudinally of said collar.

19. A device for connecting two boats arranged in substantial parallelism comprising a bar having two arms each provided with hooked ends adapted for pivotal connection to one of said boats, the other end of said bar terminating in a collar, a rod longitudinally slidable within said collar and pivotally connected at one end to the other boat, and means for holding said rod in adjusted position longitudinally of said collar, said means comprising spaced projections carried by one of said arms, and a handle rotatably mounted on the free end of said rod and movable to position between adjacent projections, substantially as described.

20. The combination with two connected boats having a water space therebetween, of water-enclosing members projecting from the end of each boat and contacting the member projecting from the other boat, and means for resiliently maintaining the contact between said members.

21. The combination with two connected boats having a water space therebetween, of water-enclosing members projecting from the end of each boat, and contacting the member projecting from the other boat, and means for resiliently maintaining the contact between said members, said means comprising a spring interposed between each member and its connected boat and exerting its influence to move said member away from said boat, substantially as described.

22. A fleet adapted for water navigation comprising, in combination with a multiplicity of cargo units, in combination with means adapted to extend between and laterally separate the units, when arranged in two or more rows, said means permitting limited relative movement between the units, and with means for preventing access of water into the space between the ends of two connected units in the same row.

23. A fleet adapted for water navigation comprising, in combination with a power boat and a multiplicity of connected cargo units adapted to be moved through the water by said boat, of means extending between and laterally separating two opposite units when arranged in two or more rows, means carried by said boat for steering the rows of units, and means preventing access of water into the space between the ends of two connected units in the same row.

24. A fleet adapted for water navigation comprising, in combination with a power boat and a multiplicity of cargo units adapted to be moved through the water by said boat, means extending between and laterally separating two opposite units when arranged in two or more rows, means carried by said boat for steering the rows of units, and means for sealing the water space between the ends of two connected units in the same row.

25. A fleet adapted for water navigation, comprising in combination with a cargo boat and a multiplicity of smaller cargo units, means facilitating the operation of loading a plurality of said units upon said boat, means for securing laterally opposite units in laterally spaced relation, when arranged in fleet formation in two or more rows, and means for sealing the water space between two connected units in the same row.

In testimony whereof I affix my signature.

CARL J. BAER.